US012792724B2

(12) United States Patent
Rubin et al.

(10) Patent No.: US 12,792,724 B2
(45) Date of Patent: Nov. 10, 2026

(54) CYBER PROTECTION OF WEB APPLICATIONS

(71) Applicant: Rein Cyber LTD, Beer-Sheva (IL)

(72) Inventors: Netanel Rubin, Beer Sheva (IL); Matan Bar Efrat, Amsterdam (NL)

(73) Assignee: Rein Cyber LTD, Beer-Sheva (IL)

( * ) Notice: Subject to any disclaimer, the term of this patent is extended or adjusted under 35 U.S.C. 154(b) by 0 days.

(21) Appl. No.: 18/806,767

(22) Filed: Aug. 16, 2024

(65) Prior Publication Data

US 2026/0050665 A1 Feb. 19, 2026

(51) Int. Cl.
*G06F 21/52* (2013.01)

(52) U.S. Cl.
CPC ........ *G06F 21/52* (2013.01); *G06F 2221/033* (2013.01)

(58) Field of Classification Search
CPC .......................... G06F 21/52; G06F 2221/033
USPC ........................................................... 726/22
See application file for complete search history.

(56) References Cited

U.S. PATENT DOCUMENTS 7,900,194 B1 * 3/2011 Mankins ............... G06F 21/554 726/25
10,817,606 B1 * 10/2020 Vincent ............... G06F 9/45558
11,620,129 B1 * 4/2023 Shimony ................. G06F 9/545 726/22
2013/0347111 A1 * 12/2013 Karta .................. H04L 63/1441 726/23
2015/0172095 A1 * 6/2015 Aho .................... G06F 11/3466 709/224
2015/0172160 A1 * 6/2015 Aho ...................... H04L 41/064 709/224
2015/0264077 A1 * 9/2015 Berger .................... G06F 21/51 726/23
2018/0285567 A1 * 10/2018 Raman .................. G06F 21/566
2019/0102285 A1 * 4/2019 DeMarco ............ G06F 11/3688
2019/0205533 A1 * 7/2019 Diehl .................... G06F 21/567
2020/0293653 A1 * 9/2020 Huang .................. G06F 21/554
2021/0099483 A1 4/2021 Shukla
2022/0050895 A1 * 2/2022 Yu ........................... G06F 21/55

(Continued)

FOREIGN PATENT DOCUMENTS

WO WO 2024/038417 2/2024
WO 2024145381 * 7/2024

OTHER PUBLICATIONS

Xueling Zhang; ConDySTA: Context-Aware Dynamic Supplement to Static Taint Analysis; IEEE:2021; pp. 796-812.*

(Continued)

*Primary Examiner* — Monjur Rahim

(57) ABSTRACT

There is provided a computer implemented method of cyber protection of an application, comprising: monitoring syscalls made by a runtime process executing the application, providing the monitored syscalls made by the runtime process to a supervisor process running externally to a runtime environment, accessing, by the supervisor process, a runtime context of the runtime process executing the application, creating, by the supervisor process, a context-aware baseline including the runtime context of the application segmented into its micro components, and preventing, by the supervisor process, execution of syscalls by the runtime environment executing the application that deviate from the context-aware baseline.

28 Claims, 4 Drawing Sheets

(56) References Cited

U.S. PATENT DOCUMENTS

| | | | | |
|---|---|---|---|---|
| 2022/0417257 | A1* | 12/2022 | Behl | H04L 63/1416 |
| 2023/0385403 | A1* | 11/2023 | Czerninski | G06F 11/3604 |
| 2023/0409412 | A1* | 12/2023 | Kruegel | G06F 9/541 |
| 2024/0095341 | A1* | 3/2024 | Venkataramani | G06F 21/54 |
| 2024/0134961 | A1* | 4/2024 | Shinde | G06F 21/52 |
| 2024/0143740 | A1 | 5/2024 | Subhreveti et al. | |
| 2024/0297893 | A1* | 9/2024 | Ahmed | G06F 9/4881 |
| 2024/0330458 | A1* | 10/2024 | Strogov | G06F 11/1451 |

OTHER PUBLICATIONS

Supplementary European Search Report and the European Search Opinion Dated Sep. 12, 2025 From the European Patent Office Re. Application No. 25195668.6. (8 Pages).

* cited by examiner

CYBER PROTECTION OF WEB APPLICATIONS

BACKGROUND

The present invention, in some embodiments thereof, relates to cyber security and, more specifically, but not exclusively, to cyber protection of applications.

Cyber protection of applications involves implementing measures to safeguard applications from cyber threats such as data breaches, hacking, and malware.

SUMMARY

According to a first aspect, a computer implemented method of cyber protection of an application, comprises: monitoring syscalls made by a runtime process executing the application, providing the monitored syscalls made by the runtime process to a supervisor process running externally to a runtime environment, accessing, by the supervisor process, a runtime context of the runtime process executing the application, creating, by the supervisor process, a context-aware baseline including the runtime context of the application segmented into its micro components, and preventing, by the supervisor process, execution of syscalls by the runtime environment executing the application that deviate from the context-aware baseline.

According to a second aspect, a system for cyber protection of an application, comprises: at least one processor executing a code for: monitoring syscalls made by a runtime process executing the application, providing the monitored syscalls made by the runtime process to a supervisor process running externally to a runtime environment, accessing, by the supervisor process, a runtime context of the runtime process executing the application, creating, by the supervisor process, a context-aware baseline including the runtime context of the application segmented into its micro components, and preventing, by the supervisor process, execution of syscalls by the runtime environment executing the application that deviate from the context-aware baseline.

According to a third aspect, a non-transitory medium storing program instructions for cyber protection of an application, which when executed by at least one processor, cause the at least one processor to: monitor syscalls made by a runtime process executing the application, provide the monitored syscalls made by the runtime process to a supervisor process running externally to a runtime environment, access, by the supervisor process, a runtime context of the runtime process executing the application, create, by the supervisor process, a context-aware baseline including the runtime context of the application segmented into its micro components, and prevent, by the supervisor process, execution of syscalls by the runtime environment executing the application that deviate from the context-aware baseline.

In a further implementation form of the first, second, and third aspects, execution of the application by the runtime process is maintained while the execution of syscalls is prevented.

In a further implementation form of the first, second, and third aspects, the supervisor process resides inside the runtime process and outside the runtime environment.

In a further implementation form of the first, second, and third aspects, during a learning phase, at least one of: a respective context-aware baseline is created by monitoring context and execution of syscalls for each corresponding micro component of a plurality of micro components of the application, and a context-aware baseline is created by monitoring context and execution of syscalls of a combination of two or more micro components of the application.

In a further implementation form of the first, second, and third aspects, at least one of: the deviation of the execution of the syscalls of each micro component is determined for relative to the corresponding context-aware baseline defined for the respective micro component, the deviation of the execution of the syscalls for a combination of two or more micro components is determined relative to the context-aware baseline defined for the combination of two or more micro components, and the deviation of execution of the syscalls is from a combination of two or more context-aware baselines defined for two or more micro components.

In a further implementation form of the first, second, and third aspects, the micro components include URL endpoints and/or libraries.

In a further implementation form of the first, second, and third aspects, a respective runtime context may be accessed for reach respective syscall at a time at which the respective syscall is made, wherein each respective syscall is associated with its own respective runtime context.

In a further implementation form of the first, second, and third aspects, the application comprises a web application communicating with a remote client terminal over a network.

In a further implementation form of the first, second, and third aspects, the features of the first, second, and third aspects, are iterated in response to each triggering request message received from a client terminal for accessing the application, wherein the context-aware baseline of each iteration is specific for the context associated with the triggering request message.

In a further implementation form of the first, second, and third aspects, the current runtime context includes a runtime stack trace.

In a further implementation form of the first, second, and third aspects, the current runtime context includes a HTTP request received from a client that triggered execution of the application.

In a further implementation form of the first, second, and third aspects, the current runtime context includes at least one of: libraries, and dependencies.

In a further implementation form of the first, second, and third aspects, the syscalls for which execution is prevented are selected for reducing likelihood of exploitation of vulnerabilities in code of the application.

In a further implementation form of the first, second, and third aspects, the monitoring of the syscalls is triggered in response to a request message from the client over the network.

In a further implementation form of the first, second, and third aspects, the request message is included in the context-aware baseline.

In a further implementation form of the first, second, and third aspects, the request messages triggers loading of the web application into the runtime process and execution of the application by the runtime process, wherein the monitoring of the syscalls is initiated in response to the loading and execution of the application.

In a further implementation form of the first, second, and third aspects, the runtime environment executes the micro components, wherein the monitored syscalls are made by the micro components, wherein the micro components are included in the runtime context.

In a further implementation form of the first, second, and third aspects, the supervisor process performs the accessing the runtime context, and the creating the context-aware baseline for detection and/or profiling.

In a further implementation form of the first, second, and third aspects, an entirety of the application resides inside the runtime environment.

In a further implementation form of the first, second, and third aspects, the context-aware baseline includes arguments of the syscalls per micro component of the application.

In a further implementation form of the first, second, and third aspects, the arguments of the syscalls include one or more of: process being executed, file name to write to, IP address to connect to.

In a further implementation form of the first, second, and third aspects, further comprising creating a filter by the supervisor process, the filter created according to the context-aware baseline for preventing execution of the syscalls that fall outside the context-aware baseline and allowing execution of the syscalls that fall within the context-aware baseline.

In a further implementation form of the first, second, and third aspects, the filter is created using seccomp_unotify.

In a further implementation form of the first, second, and third aspects, monitoring the syscalls includes monitoring the inputs and/or outputs associated with the syscall.

In a further implementation form of the first, second, and third aspects, the application is implemented within a serverless computing environment.

In a further implementation form of the first, second, and third aspects, the syscalls are monitored from within the runtime process itself.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
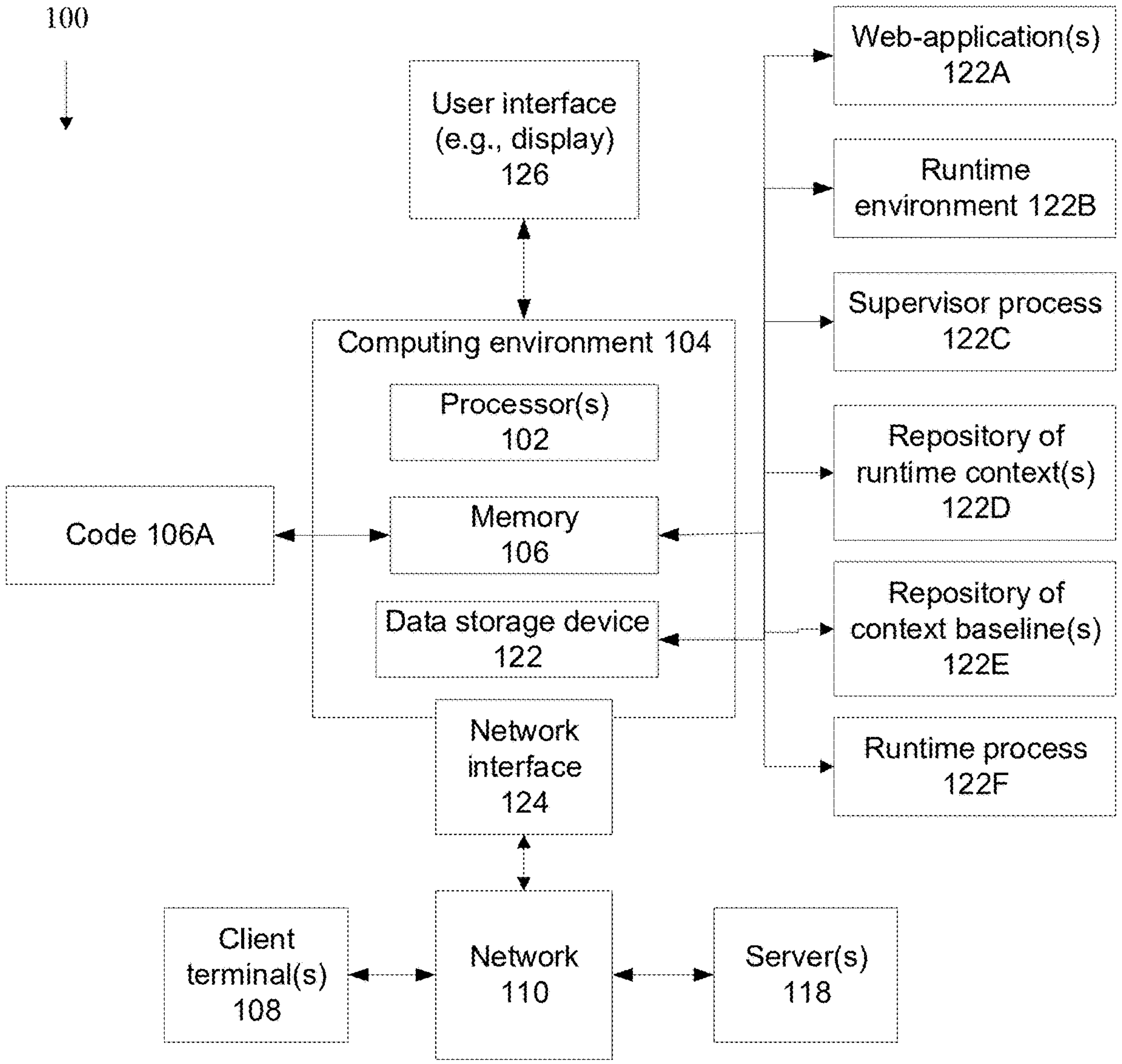
FIG. 1 is a block diagram of components of a system for providing cyber protection for a web application(s) based on a context-aware baseline, in accordance with some embodiments of the present invention.

Cyber protection of web applications involves implementing measures to safeguard applications from cyber threats such as data breaches, hacking, and malware.

As used herein, the term application may refer to web applications.

As used herein the term syscall and syscalls may sometimes be interchanged. For example, the monitoring and blocking of syscalls may refer to single/individual syscalls and/or to a set of syscalls.

An aspect of some embodiments of the present invention relates to systems, methods, computing device, and/or code instructions (e.g., stored on a data storage device and executable by one or more processors) for providing cyber protection for an application, optionally a web application. Syscalls made by a runtime process executing the application are monitored. The monitoring may be triggered in response to a request message to access the web application from a client terminal over a network, for example, a Hypertext Transfer Protocol (HTTP) request. The syscalls may be made by the runtime process executing one or more micro components of the application. The monitored syscalls made are provided to a supervisor process running externally to the runtime environment. The supervisor process runs within the runtime process. The supervisor process accesses a runtime context of the runtime process executing the application. The runtime context may include the runtime stacktrace and/or the triggering HTTP request. The supervisor process creates a context-aware baseline including context of the application segmented into its micro components. A context-aware baseline may be created for each micro component, and/or for a combination of micro components. The context-aware baseline represents "normal", i.e., non-malicious, activity of the syscalls of the micro component(s) within the context. The context-aware baseline may be created during a learning phase. Execution of syscalls by the runtime environment within the context, optionally per micro component and/or per combination of micro components, are analyzed relative to the context-aware baseline to determine a deviation, for example, statistically significant deviation and/or deviation greater than a threshold. The deviation may indicate likelihood of malicious activity, for example, malware, a hacking attempt, and the like. In response to determining the deviation, execution of syscalls by the runtime environment executing the application may be prevented by the supervisor process.

It is noted that monitoring from the Operating System (OS) (Kernel-level) enables visibility of the syscall. However, monitoring from the OS (Kernel-level) does not provide the application context (e.g., Runtime stacktrace). At least some approaches described herein provide visibility of the full flow, for example, HTTP [Request]→syscall→stacktrace [application code-level], which enables determining if the syscall deviates from a context-aware baseline indicating likelihood of malicious activity, and/or blocking execution of the syscall.

At least one embodiment described herein addresses the technical problem of protecting an application from attack, such as automated attacks (e.g., malware) and/or manual attacks (e.g., hacking). At least one embodiment described herein improves the technical field of cyber security, by protecting applications from attack. At least one embodiment described herein improves upon prior approaches of protecting applications from attack.

At least one embodiment described herein provides an Application Detection and Response (ADR) feature, operating in the web application runtime environment, providing in-context cyber protection and visibility. Application Detection and Response (ADR) is a cybersecurity strategy and set of technologies designed to detect and respond to threats and anomalies at the application layer. While traditional security measures often focus on network or endpoint security, ADR specifically targets applications, which are frequent vectors for cyberattacks due to their complexity and critical role in business operations.

At least one embodiment described herein provides cyber protection for web applications. The web application may refer to a software application that runs on a web server, on-premises, in a cloud, a serverless environment, and the like. The web application is accessed remotely by a client, for example, through a web browser over the internet or an intranet. Unlike traditional desktop applications, which are installed on a local computer, web applications are hosted on a remote server and can be accessed from remote clients with a network connection. Due to the ability to be accessed remotely by different clients, it is technically challenging to protect web applications. Web applications may suffer from attacks exploiting vulnerability in their code, for example:

SQL Injection (SQLi): Attackers exploit vulnerabilities in web applications to execute malicious SQL queries.

Cross-Site Scripting (XSS): Attackers inject malicious scripts into web pages viewed by other users.

Cross-Site Request Forgery (CSRF): Attackers trick users into performing actions they did not intend.

At least one embodiment described herein detecting cyber-attacks on applications in a true, impact driven manner, while focusing on operational efficiency, seamless integration, and rapid threat mitigation.

At least one embodiment described herein addresses the aforementioned technical problem(s), and/or improves the aforementioned technical field(s), and/or improves upon the aforementioned existing approaches, by monitoring and/or analyzing syscalls made to the operating system by the runtime process executing the code of the web application. The monitored syscalls made are provided to a supervisor process running externally to a runtime environment and within the runtime process. The supervisor process accesses a runtime context of the runtime environment executing the application, for example, the runtime stacktrace and/or the triggering HTTP request. The supervisor process creates a context-aware baseline including context of the application segmented into its micro components. A context-aware baseline may be created for each micro component, and/or for a combination of micro components. Execution of syscalls by the runtime environment within the context, optionally per micro component and/or per combination of micro components, are analyzed relative to the context-aware baseline to determine a deviation, for example, statistically significant deviation and/or deviation greater than a threshold. The deviation may indicate likelihood of malicious activity, for example, malware, a hacking attempt, and the like. In response to determining the deviation, execution of syscalls by the runtime environment executing the application may be prevented by the supervisor process.

Execution of the application by the runtime process may be maintained while the execution of the syscalls (that deviate from the context aware-baseline) is prevented. A singular request may be blocked. This is in contrast to some existing approaches that "kill" the process of the application, which introduce reliability issues and/or may cause other disturbances resulting from sudden terminal of the application.

Even though the runtime process is the one executing the web application's code, detecting and/or prevent exploitation of vulnerabilities in the web application's code itself may be performed based on monitoring and/or analyzing the syscalls made by the runtime process. Moreover, as the entirety of the web application resides inside of the runtime process, simply observing the syscalls executed by the runtime process could not provide sufficiently accurate data for detecting malicious activity. A simple observation of the syscalls executed by the runtime process may be inaccurate, for example, as there are many micro components (e.g., URL endpoints and/or libraries) providing different functionality. For example, different URL endpoints are restricted to specific roles, restricted to internal functionality, and the like.

Moreover, in at least one embodiment, the runtime context (e.g., the runtime stack trace and/or a request message such as HTTP request that triggered execution of the web application) is used for providing accurate detection and/or prevention of malicious activity.

Moreover, in at least one embodiment, to enable monitoring the runtime syscalls while also having access to the runtime context, the syscalls are monitored from within the runtime itself.

Moreover, in at least one embodiment, considering the arguments of the syscalls as part of the context-aware baseline improves accuracy of preventing malicious activity. Blindly preventing or allowing a syscall without considering the argument may block the application's regular behavior and may not provide a sufficiently accurately solution for security of web applications.

At least one embodiment described herein addresses the aforementioned technical problem(s), and/or improves the aforementioned technical field(s), and/or improves upon the aforementioned existing approaches, by generating a baseline for one or more micro-components of the web application, and monitoring deviations from the baseline for detecting likelihood of malicious activity. This enables protecting the application layer. The baseline may be generated for each micro-component, and/or for a combination of multiple micro-component. The deviation may be per baseline, and/or for a combination of multiple baselines. The generation of the baseline, and use of the baseline for detection of likelihood of malicious activity, used for protection of the application layer, is different, for example, from Endpoint Detection and Response (EDRs) approaches for protecting for example, personal computers and/or from Cloud Detection and Response (CDRs) approaches for protecting cloud infrastructure. Activity of an application running within the cloud environment is not visible in the micro component level to CDR approaches. In contrast, at least one embodiment described herein is able to monitoring the application running within the cloud environment and take action accordingly.

At least one embodiment described herein addresses the aforementioned technical problem(s), and/or improves the aforementioned technical field(s), and/or improves upon the aforementioned existing approaches, by considering the runtime context for each event, for example, considering the runtime stacktrace and/or the triggering HTTP request. Considering the runtime context is different than other approaches ADR approaches.

At least one embodiment described herein addresses the aforementioned technical problem(s), and/or improves the aforementioned technical field(s), and/or improves upon the aforementioned existing approaches, by an architecture in which the supervisor process resides inside the runtime process, but outside the runtime environment. The runtime environment runs the web-application. Having the supervisor process residing inside the runtime process and external to the runtime environment enables regular execution of the runtime environment without tampering and/or modification of the code flows within runtime environment. Moreover, the monitoring within the runtime process by the supervisor process enables accessing the runtime context, which is used for detecting likelihood of malicious activity, as described herein. This architecture is different than other approaches that either monitor the runtime environment from inside the runtime environment, which requires changing code flows, and/or monitoring from completely outside of the runtime process.

At least one embodiment described herein address the technical problem of deploying a cybersecurity process in a serverless environment. Agents for detection of malicious activity based on the standard approaches cannot be deployed in serverless environments. Using standard approaches, a solution that attempts to perform detection and provide a response is extremely limited in its capabilities, often not supporting the serverless environment. At least one embodiment described herein addresses the aforementioned technical problem(s), and/or improves the aforementioned technical field(s), and/or improves upon the aforementioned existing approaches, by the architecture based on the supervisor process that is provided with monitored syscalls, where the supervisor process is located externally to the runtime environment and within the runtime process, that accesses the runtime context of the runtime environment to generate a context-aware baseline. Such architecture may be deployed within the serverless environment.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
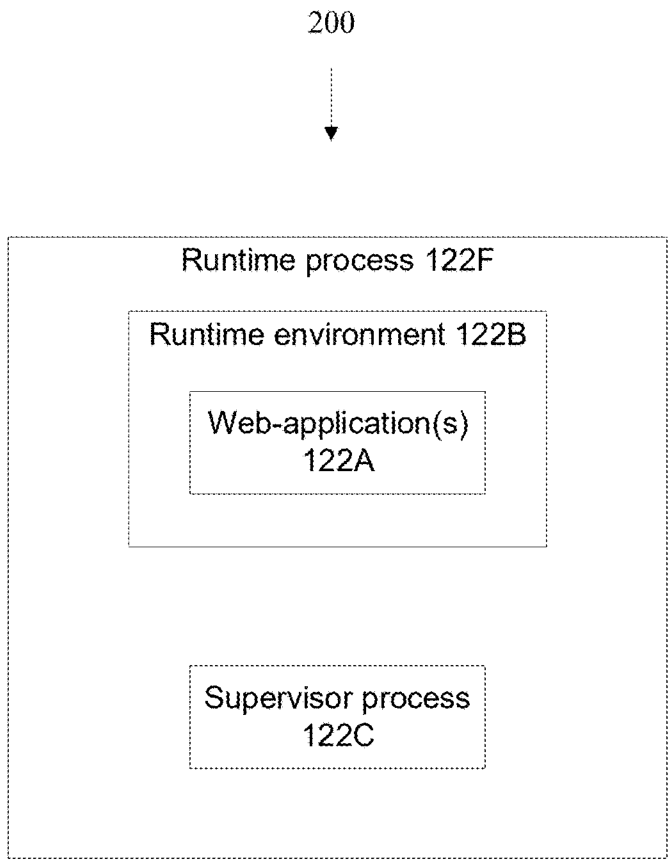
FIG. 2 is a schematic depicting logical relationships between different executing code processes, in accordance with some embodiments of the present invention.
Figure 3:
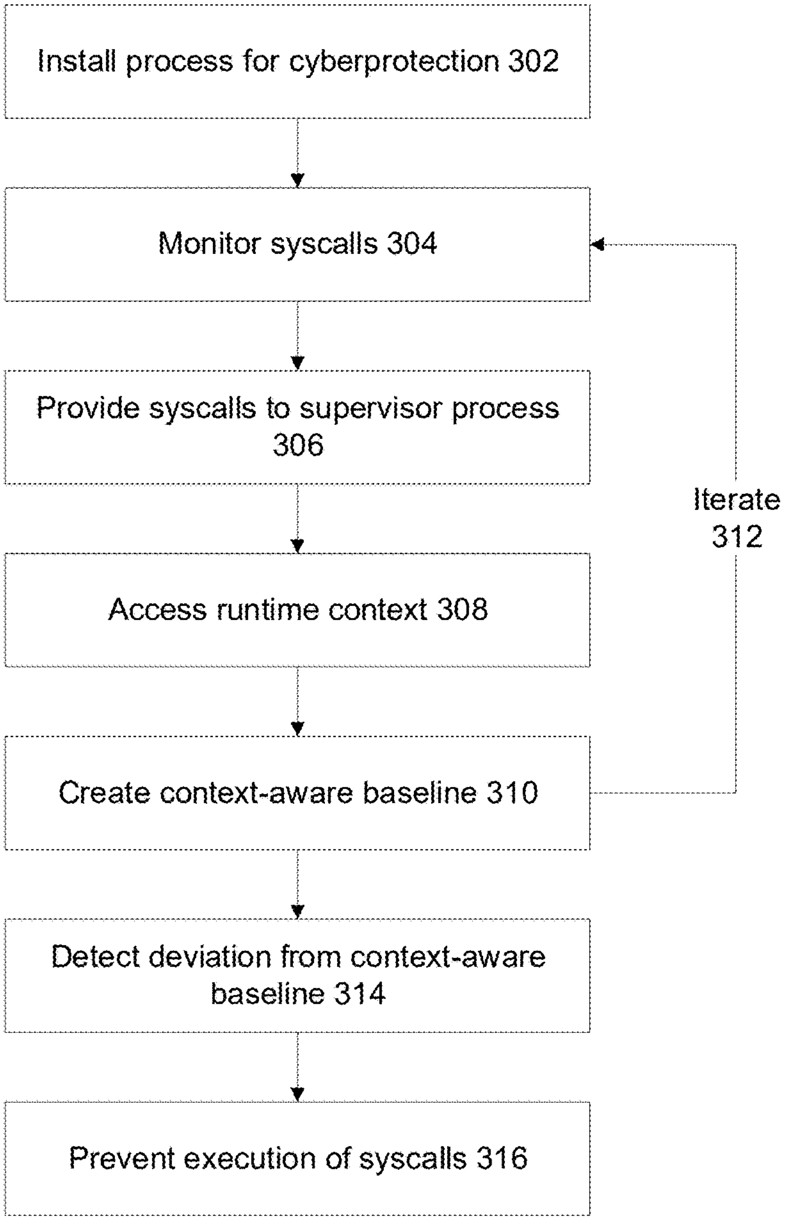
FIG. 3 is a flowchart of a method of providing cyber protection for a web application(s) based on a context-aware baseline, in accordance with some embodiments of the present invention.
Figure 4:
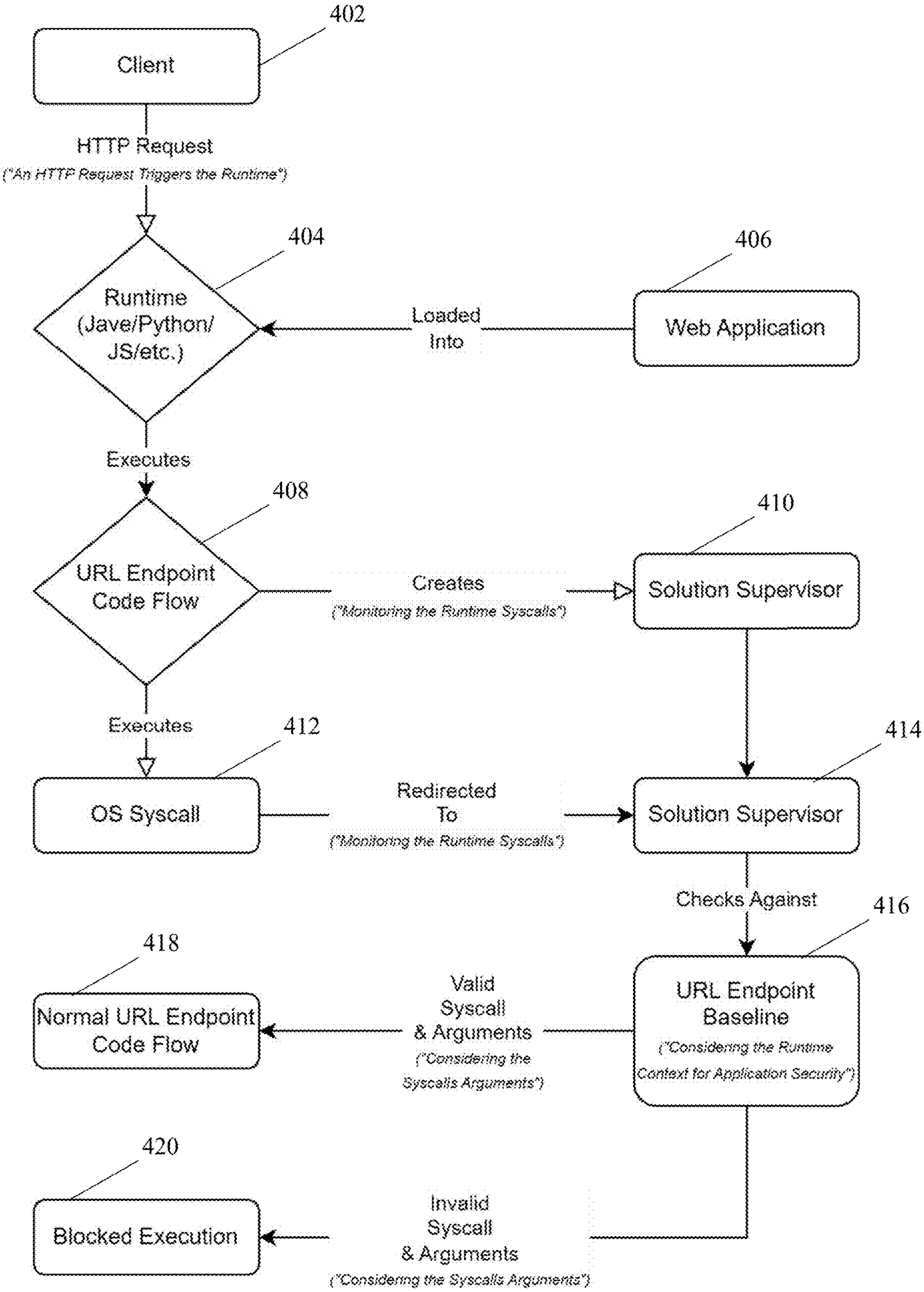
FIG. 4 is a flowchart of another method of providing cyber protection for a web application(s) based on a context-aware baseline, in accordance with some embodiments of the present invention.

Reference is made to FIG. 1, which is a block diagram of components of a system 100 for providing cyber protection for a web application(s) 122A based on a context-aware baseline, in accordance with some embodiments of the present invention. Reference is also made to FIG. 2, which is a schematic 200 depicting logical relationships between different executing code processes, in accordance with some embodiments of the present invention. Reference is also made to FIG. 3, which is a flowchart of a method of providing cyber protection for a web application(s) based on a context-aware baseline, in accordance with some embodiments of the present invention. Reference is also made to FIG. 4, which is a flowchart of another method of providing cyber protection for a web application(s) based on a context-aware baseline, in accordance with some embodiments of the present invention.

System 100 may implement the acts of the method described with reference to FIGS. 3-4, by processor(s) 102 of a computing environment 104 executing code instructions stored in a memory 106 (also referred to as a program store).

Computing environment 104 may be implemented as, for example one or more and/or combination of: a group of connected devices, a client terminal, a server, a virtual server, a computing cloud, a virtual machine, a desktop computer, a thin client, a network node, and/or a mobile device (e.g., a Smartphone, a Tablet computer, a laptop computer, a wearable computer, glasses computer, and a watch computer).

Computing environment 104 may represent one or more of the following environment for executing web application(s) 122A, for example, on-premises, within a computing cloud, and in a serverless environment.

Computing environment 104 executing stored code instructions 106A, may be implemented for hosting web application(s) 122A for access and/or for providing services (e.g., one or more of the acts described with reference to FIG. 3 and/or FIG. 4) to client terminal(s) 108. For example, on-premises, within a computing cloud, and in a serverless environment. Web application(s) 122A are protected using supervisor process 122C that analyses syscalls made by web application(s) 122A executed by runtime environment 122B, to detect suspicious activity (e.g., indicating of an attack, such as by malware and/or a hack) for preventing certain syscalls for protection of code of the web application(s) 122A, as described herein.

Multiple architectures of system 100 based on computing environment 104 may be implemented:

In one example, supervisor process 122C and web application(s) 122A may be executed by the same computing environment 104, for example, the same processor(s) 102, the same underlying hardware, and the like. It is noted that supervisor process 122C may be virtually separated from web application(s) 122A, for providing a virtual barrier for protecting supervisor process 122C.

In another example, web application(s) 122A and runtime environment 122B may be executed by one or more other server(s) 118, providing access and/or services to client terminal(s) 108. Computing environment 104 provides security of the web application(s) 122A running on server(s) 118, such as by receiving syscalls sent from server(s) 118, and/or accessing the runtime context.

Processor(s) 102 of computing environment 104 may be hardware processors, which may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogeneous or heterogeneous) arranged for parallel processing, as clusters and/or as one or more multi core processing devices.

Memory 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the method described with reference to FIG. 3 and/or FIG. 4 when executed by hardware processor(s) 102.

Computing environment 104 may include a data storage device 122 for storing data, for example, one or more of: web application(s) 122A that may be accessed by client terminals 108, runtime environment 122B that executes web application(s) 122A, supervisor process 122C, repository of runtime context(s) 122D set for storing data used to determine the runtime context and/or create the context-aware baseline, a repository of context-aware baseline(s) 122E set for storing context-aware baselines created for different cases, and a runtime process 122F which embeds the runtime environment. Data storage device 122 may be implemented as, for example, a memory, a local hard-drive, virtual storage, a removable storage unit, an optical disk, a storage device, and/or as a remote server and/or computing cloud (e.g., accessed using a network connection).

Network 110 may be implemented as, for example, the internet, a local area network, a virtual network, a wireless network, a cellular network, a local bus, a point to point link (e.g., wired), and/or combinations of the aforementioned.

Computing environment 104 may include a network interface 124 for connecting to network 110, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Computing environment 104 may be in communication with one or more user interfaces 126 designed to enter data and/or present data. Exemplary user interfaces 126 include, for example, one or more of, a touchscreen, a display, gesture activation devices, a keyboard, a mouse, and voice activated software using speakers and microphone.

Referring now back to FIG. 2, schematic 200 depicts logical relationships between different executing code processes. Runtime process 122F embeds runtime environment 122B (not to be confused with the OS environment). Runtime environment 122B executes application 122A, optionally a web application. An entirety of application 122A resides may reside inside runtime environment 122B. Supervisor process 122C resides inside runtime process 122F, but outside runtime environment 122B. The architecture depicted in FIG. 2 enables regular execution of runtime environment 122B without tampering and/or modification of the code flows within runtime environment 122B. Moreover, monitoring within runtime process 122F by supervisor process 122C enables access the runtime context, which is used for detecting likelihood of malicious activity, as described herein. The architecture depicted in FIG. 2 is different than other approaches that either monitor the runtime environment from inside the Runtime Environment, which requires changing code flows, and/or monitoring from completely outside of the runtime process.

Referring now back to FIG. 3, at 302, a process for providing cybersecurity to an application may be installed. The process for providing cybersecurity may implement one or more of features 304-316 of FIG. 3.

The application may be implemented as a web application communicating with one or more remote client terminals over a network.

The application (e.g., web application) may be implemented within a serverless computing environment, and the process for providing cybersecurity to the application may be implemented within the serverless computing environment. The design of the process for providing cybersecurity may enable deployment within the serverless computing environment, in contrast to standard cybersecurity approaches which are unsuitable for deployment within the serverless computing environment, for example, as described herein.

Application may be deployed in other architectures, for example, on premises, within a cloud, within a server, and the like.

The application may be deployed, for example, as described with reference to FIG. 1 and/or FIG. 2.

At 304, syscalls made by the runtime process executing the application, are monitored.

The syscalls may be monitored by the supervisor process. The supervisor process may reside within the runtime process and outside the runtime environment, as described herein.

The syscalls may be monitored from within the runtime process itself.

The runtime process, which contains the application, may feature multiple URL endpoints that may serve as the entry point of the code-flows defining the web application itself.

The runtime process executes the code of the application, which may call an underline mechanism of the Operating System, i.e., syscalls. These syscalls are the ones responsible for handling processes, working with the file system, opening network connections and more.

The monitoring of the syscalls may be triggered in response to a request message from the client over the network, such as to access the application, for example, an HTTP request. The request messages may trigger loading of the application into the runtime process and execution of the application by the runtime process. The monitoring of the syscalls may be initiated in response to the loading and execution of the application.

A syscall, or system call, is a mechanism that allows a process to request a service from the operating system's kernel. This service may include, for example, hardware-related tasks like reading or writing to a file, managing memory, creating or terminating processes, and the like. System calls may provide a controlled interface for processes to interact with the operating system, which may help ensure that these interactions are performed safely and efficiently. When a process needs to perform an operation that requires kernel-level resources, it issues a syscall, which the kernel then processes and executes. Syscalls may be initiated using a software interrupt or a specific instruction that switches the processor to kernel mode, allowing the operating system to perform the requested task on behalf of the application.

Examples of common system calls include:

File Management: open, read, write, close.

Process Management: fork, exec, wait, exit.

Memory Management: mmap, munmap, brk.

Network Management: socket, bind, connect, send, recv.

The monitoring of the syscalls may include monitoring of the inputs and/or outputs associated with the syscall. The inputs may be arguments that are passed into functions called as part of the syscall. The outputs may be the data generated by the processing of the syscall, and/or the output generated by the syscall.

At 306, the monitored syscalls made by the runtime process are provided to a supervisor process.

The supervisor process may run externally to the runtime environment, and/or may reside inside the runtime process. The location of the supervisor process enables regular execution of the runtime environment and its code flows, without tampering and/or without modification, and/or enables obtaining the runtime context. This is in contrast to other approaches which require tampering and/or modification of code flows of the runtime environment, and/or which do not provide access to the runtime context.

At 308, the supervisor process accesses a runtime context of the runtime process executing the application.

The runtime context may include the state and/or environment in which the application executes. The runtime context may include the data and/or resources that the application uses to run, for example, memory allocation, variable values, execution stack, CPU registers, and the state of the operating system. The runtime context may be established when the application starts and may be dynamically updated as the application executes.

One or more of the following data elements may be accessed and included within the runtime context:

- A runtime stack trace.
- A hypertext transfer protocol (HTTP) request received from a client that triggered execution of the application.
- Libraries
- Dependencies.
- Arguments of the syscalls, optionally per micro component of the application. The arguments of the syscalls may include one or more of: process being executed, file name to write to, IP address to connect to.
- Micro components, for example, URL endpoints and/or libraries. The Micro components may be executed by the runtime environment. The monitored syscalls may be made by the micro components.
- In embodiments in which the monitoring of the syscalls is triggered in response to a request message from the client over the network, the request message may be included as part of the runtime context.

Optionally, a respective runtime context may be accessed for reach respective syscall at a time at which the respective syscall is made. Each respective syscall at each respective time at which it is called may be associated with its own runtime context.

At 310, one or more context-aware baselines are created. The context-aware baseline(s) may be created by the supervisor process. The context-aware baseline may be used for detection possible security threats and/or profiling possible security threats, as described herein.

The context-aware baseline(s) includes one or more of the data elements accessed from the runtime context of the application. The data elements of the runtime context may be segmented into the micro components, for inclusion in one or more context-aware baselines.

Optionally, a respective context-aware baseline is created for a corresponding micro component, such as for each URL endpoint and/or for each library. Alternatively or additionally, multiple context-aware baselines may be created, where each respective context-aware baseline is for a respective micro component. A combination of multi context-aware baselines may be defined, for example, representing a combination of micro components. Alternatively or additionally, a certain context-aware baseline may be created from a combination of two or more micro components.

The context-aware baseline may be include a set of syscalls and their arguments that each micro component made. The context-aware baseline may be segmented between micro components in an independent way.

Each micro component may be associated with its own unique set of data elements associated with the runtime context, for example, indicating a certain set of behaviors. Using context-aware baseline(s) corresponding to individual micro components and/or combination of micro components enables independently profiling each micro component and/or combination of micro components.

At 312, one or more features 304-310 may be iterated over time, such as in response to different syscalls.

Optionally, the iterations may be during a learning phase for creating the context-aware baseline(s). The learning phase may be during "normal" operation of the application.

During the learning phase, the context-aware baseline(s) may be dynamically created and/or updated. A respective context-aware baseline(s) may be created and/or updated for each micro component by monitoring context and/or execution of syscalls for each corresponding micro component of the application. Alternatively or additionally, the context-aware baseline may be created and/or updated by monitoring context and execution of syscalls of a combination of two or more micro components of the application. Each context-aware baseline may mirror actions by the corresponding micro component(s) of the application during the learning phase.

The context-aware baseline(s) may be defined over time, such as a sequence, for example, indicating "normal" non-malicious operation over time. Alternatively or additionally, a new context-aware baseline may be created for each iteration, such as a snapshot in time.

The iteration may be in response to each triggering request message received from a client terminal for accessing the application. The context-aware baseline of each iteration may be specific for the runtime context associated with the triggering request message.

At 314, a deviation of the execution of one or more of the monitored syscalls of one or more micro components from the corresponding context-aware baseline may be detected.

Deviating syscalls may refer to syscalls that are fall outside of the context-aware baseline(s). Non-deviating syscalls may refer to syscalls that are fall within the context-aware baseline(s).

A deviation may indicate abnormal operation, which may indicate malicious activity. Lack of deviation may indicate normal operation. The amount of deviation from the context-aware baseline may be correlated with a probability of malicious activity. Optionally, any deviation from the context-aware baseline may automatically be designated as an anomaly. If the deviation occurs in a certain amount such as above a threshold (e.g., 10%, 20%, or other value) of syscalls then the deviation may be designated as a new legitimate app behavior, with the context-aware baseline dynamically adapted to include the new legitimate app behavior therein. In terms of actual operation there is not necessarily any importance to the type of deviation as security sensitive operations are being monitored, which are all treated as being suspicious. Alternatively, the amount of deviation is non-correlated with probability of malicious activity. For example, the outcome of the determination of the deviation may be binary, such as deviation indicating likelihood of malicious activity, and non-deviation indicating normal activity.

The deviation of the execution of the syscalls of each micro component is determined relative to the corresponding context-aware baseline defined for the respective micro component. The deviation of the execution of the syscalls may be for a combination of two or more micro components, relative to the context-aware baseline defined for the combination of two or more micro components, and/or relative to a combination of two or more context-aware baselines defined for two or more micro components.

The different context-aware baseline(s) for different micro components may help identify when most applications malicious attacks are performing operations that are not unique to the runtime process as a whole but differentiate from the baseline of one of the application's micro components, URL endpoints being most of them. For example, one of the URL endpoints, that is only accessible to administrators, allows uploading files into the server hosting the web-application. This feature is allowed because only trusted admins are able to access this URL endpoint. If, for example, a vulnerability exists in another URL endpoint, which successful exploitation of it allows the same feature of uploading files into the server (a very common scenario), then nothing suspicious is acting on the macro level of the web-application (as file uploading is already a feature). However on the micro level, a deviation from the context-aware baseline of this URL endpoint enables detection of the malicious activity.

At 316, in response to detecting the deviation, execution of the syscall(s) may be prevented. For example, by blocking further implementation of the syscall, and/or issuing an error for the attempted implementation of the syscall. The prevention of execution of the syscalls may be performed by the supervisor.

Execution of the application by the runtime process may be maintained while the execution of the syscalls (that deviate from the context aware-baseline) is prevented. A singular request may be blocked, while the application may continue running.

The syscall(s) that deviated from the context-aware baseline may be prevented from execution. Other syscalls may also be prevented from execution, from example syscalls which are expected to be related to the deviating syscalls (e.g., in a predicted sequence of syscalls). Preventing other syscalls from execution may help prevent damage from malicious activity and/or help contain the malicious activity.

The deviation may be analyzed to determine whether malicious activity is likely occurring. For example, analyzing a combination of deviations from multiple context-aware baselines and/or a deviation from a combination of multiple context-aware baselines and/or deviations from different context-aware baselines (of different micro components). Such deviation may be referred to as a macro-level deviation. For example, if a certain percentage of HTTP requests trigger new functionality (e.g., new behavior), an attack is unlikely as those HTTP requests are commonly a very low amount of requests.

A filter may be created, optionally by the supervisor process. The filter may be created according to the context-aware baseline for preventing execution of the syscalls that deviate from the context-aware baseline. The filter may be created for allowing execution of the syscalls that do not deviate from (e.g., fall within) the context-aware baseline.

The filter may be a dedicated Berkeley Packet Filter (BPF) filter.

The filter may be created using seccomp, which may integrate a "user_notify" system, for example, seccomp_unotify. Creating the filter using seccomp_unotify may enable providing the syscalls made by the runtime process to the external supervisor. Creating the filter using seccomp_unotify may further enable the supervisor to identify the runtime context of the application for creating the context-aware baseline. Creating the filter using seccomp_unotify may further enable the supervisor to prevent execution of the syscalls that deviate from the context-aware baseline. Yet another potential advantage of using the filter created using seccomp_unotify (e.g., seccomp BPD filter "user_notify") is the ability to consider the syscalls arguments when building the context-aware baseline and enforcing the context-aware baseline. This may provide more accurate prevention capabilities by considering the argument as part of the context-aware baseline. In contrast, blindly preventing or allowing a syscall without considering the argument (e.g., the process being executed, the file name to write to, the IP address to connect to) will block the application's regular behavior and could not provide a sufficient solution for security of applications.

The syscalls for which execution is prevented may be selected for reducing likelihood of exploitation of vulnerabilities in code of the application.

Optionally, one or more other actions may be automatically implemented. For example:

- Presenting an alert on a display of a computer of an operator, indicating that malicious activity was detected, and/or which syscalls were prevented from execution.
- Triggering of an automated process for isolating the micro component that issued the syscalls prevented from execution.
- Tearing down and/or blocking a network connection with the client terminal that led to the syscalls prevented from execution, for example, for preventing a hacker from gaining access to the server.

Referring now back to FIG. 4, at 402, a client sends an HTTP request to a web-application.

At 404, the HTTP request is received by the runtime process.

At 406, the received HTTP request triggers loading of the web-application into the runtime process, and execution of the web application by the runtime process.

At 408, micro components of the web-application make a syscall(s), for example, URL endpoint code flow make the syscall(s).

At 410, the syscall(s) are provided to a supervisor process (i.e., solution supervisor). The supervisor process is located external to a runtime environment and within the runtime process, as described herein. The supervisor process creates a context-aware baseline including the runtime context of the application segmented into its micro components.

Alternatively or additionally to 410, at 412, syscall(s) are executed.

At 414, information regarding the executing syscall(s) is provided to the supervisor process.

At 416, the supervisor process evaluates whether the information regarding the executing syscall(s) deviates from the context-aware baseline.

At 418, when no deviation from the context-aware baseline is detected, the syscall(s) and/or arguments of the syscall(s) are determined to be part of normal behavior of the micro component, for example, normal URL endpoint code flow.

Alternatively, at 420, when a deviation from the context-aware baseline is detected, the syscall(s) and/or arguments of the syscall(s) are determined to be invalid, likely associated with malicious activity. Execution of the syscall(s) may be blocked, for blocking the malicious activity.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant runtime contexts will be developed and the scope of the term runtime context is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of cyber protection of an application, comprising:
- by a runtime process embedding a runtime environment executing one or more micro components of an application, running a supervisor process externally to the runtime environment;
- monitoring, by the runtime process, syscalls made by the runtime process;
- providing, by the runtime process, the monitored syscalls made by the runtime process to the supervisor process;
- accessing, by the supervisor process, a runtime context of the runtime process;
- creating, by the supervisor process, a context-aware baseline including the runtime context segmented into micro components of the application, the context-aware baseline is created by monitoring context and execution of syscalls for each corresponding micro component of a plurality of micro components of the application; and
- preventing, by the supervisor process, execution of syscalls by the runtime environment that deviate from the context-aware baseline.

2. The computer implemented method of claim 1, wherein execution of the application by the runtime process is maintained while the execution of syscalls is prevented.

3. The computer implemented method of claim 1, wherein the supervisor process resides inside the runtime process and outside the runtime environment.

4. The computer implemented method of claim 1, wherein the context-aware baseline is created during a learning phase, by at least one of:
- monitoring context and execution of syscalls for each corresponding micro component of a plurality of micro components of the application, and
- monitoring context and execution of syscalls of a combination of two or more micro components of the application.

5. The computer implemented method of claim 1, at least one of:
- the deviation of the execution of the syscalls of each micro component is determined for relative to the corresponding context-aware baseline defined for the respective micro component,
- the deviation of the execution of the syscalls for a combination of two or more micro components is determined relative to the context-aware baseline defined for the combination of two or more micro components, and
- the deviation of execution of the syscalls is from a combination of two or more context-aware baselines defined for two or more micro components.

6. The computer implemented method of claim 1, wherein the micro components include URL endpoints and/or libraries.

7. The computer implemented method of claim 1, wherein a respective runtime context may be accessed for reach respective syscall at a time at which the respective syscall is made, wherein each respective syscall is associated with its own respective runtime context.

8. The computer implemented method of claim 1, wherein the application comprises a web application communicating with a remote client terminal over a network.

9. The method of claim 1, wherein the monitoring, the providing, the accessing, the creating and the preventing are iterated in response to each triggering request message received from a client terminal for accessing the application, wherein the context-aware baseline of each iteration is specific for the context associated with the triggering request message.

10. The computer implemented method of claim 1, wherein the runtime context includes a runtime stack trace.

11. The computer implemented method of claim 1, wherein the runtime context includes a HTTP request received from a client that triggered execution of the application.

12. The computer implemented method of claim 1, wherein the runtime context includes at least one of: libraries, and dependencies.

13. The computer implemented method of claim 1, wherein the syscalls for which execution is prevented are selected for reducing likelihood of exploitation of vulnerabilities in code of the application.

14. The computer implemented method of claim 1, wherein the monitoring of the syscalls is triggered in response to a request message from the client over the network.

15. The computer implemented method of claim 14, wherein the request message is included in the context-aware baseline.

16. The computer implemented method of claim 14, wherein the request messages triggers loading of the web application into the runtime process and execution of the application by the runtime process, wherein the monitoring of the syscalls is initiated in response to the loading and execution of the application.

17. The computer implemented method of claim 1, wherein the runtime environment executes the micro components, wherein the monitored syscalls are made by the micro components, wherein the micro components are included in the runtime context.

18. The computer implemented method of claim 1, wherein the supervisor process performs the accessing the runtime context, and the creating the context-aware baseline for detection and/or profiling.

19. The computer implemented method of claim 1, wherein an entirety of the application resides inside the runtime environment.

20. The computer implemented method of claim 1, wherein the context-aware baseline includes arguments of the syscalls per micro component of the application.

21. The computer implemented method of claim 20, wherein the arguments of the syscalls include one or more of: process being executed, file name to write to, IP address to connect to.

22. The computer implemented method of claim 1, further comprising creating a filter by the supervisor process, the filter created according to the context-aware baseline for preventing execution of the syscalls that fall outside the context-aware baseline and allowing execution of the syscalls that fall within the context-aware baseline.

23. The computer implemented method of claim 22, wherein the filter is created using seccomp_unotify.

24. The computer implemented method of claim 1, wherein monitoring the syscalls includes monitoring the inputs and/or outputs associated with the syscall.

25. The computer implemented method of claim 1, wherein the application is implemented within a serverless computing environment.

26. The computer implemented method of claim 1, wherein the syscalls are monitored from within the runtime process itself.

27. A system for cyber protection of an application, comprising:

at least one processor executing a code for:

by a runtime process embedding a runtime environment executing one or more micro components of an application, running a supervisor process externally to the runtime environment;

monitoring, by the runtime process, syscalls made by the runtime process;

providing, by the runtime process, the monitored syscalls made by the runtime process to the supervisor process;

accessing, by the supervisor process, a runtime context of the runtime process;

creating, by the supervisor process, a context-aware baseline including the runtime context segmented into micro components of the application, the context-aware baseline is created by monitoring context and execution of syscalls for each corresponding micro component of a plurality of micro components of the application; and preventing, by the supervisor process, execution of syscalls by the runtime environment that deviate from the context-aware baseline.

28. A non-transitory medium storing program instructions for cyber protection of an application, which when executed by at least one processor, cause the at least one processor to:

by a runtime process embedding a runtime environment executing one or more micro components of an application, run a supervisor process externally to the runtime environment;

monitor, by the runtime process, syscalls made by the runtime process;

provide, by the runtime process, the monitored syscalls made by the runtime process to the supervisor process;

access, by the supervisor process, a runtime context of the runtime process;

create, by the supervisor process, a context-aware baseline including the runtime context segmented into micro components of the application, the context-aware baseline is created by monitoring context and execution of syscalls for each corresponding micro component of a plurality of micro components of the application; and prevent, by the supervisor process, execution of syscalls by the runtime environment that deviate from the context-aware baseline.

* * * * *